United States Patent
Izawa

(10) Patent No.: US 7,787,757 B2
(45) Date of Patent: Aug. 31, 2010

(54) DIGITAL IMAGING APPARATUS WITH CAMERA SHAKE COMPENSATION AND ADAPTIVE SENSITIVITY SWITCHING FUNCTION

(75) Inventor: Katsutoshi Izawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 704 days.

(21) Appl. No.: 11/703,203

(22) Filed: Feb. 7, 2007

(65) Prior Publication Data

US 2007/0212043 A1    Sep. 13, 2007

(30) Foreign Application Priority Data

Mar. 10, 2006    (JP)    ............... 2006-065289

(51) Int. Cl.
G03B 17/00    (2006.01)
(52) U.S. Cl. ......................................... 396/55; 396/213
(58) Field of Classification Search .............. 396/52, 396/55, 63, 69, 213; 348/208.11, 208.12, 348/208.99, 221.1
See application file for complete search history.

(56) References Cited

U.S. PATENT DOCUMENTS

| | | | |
|---|---|---|---|
| 5,218,442 A * | 6/1993 | Hamada et al. ......... 348/208.15 |
| 5,710,954 A * | 1/1998 | Inoue ......................... 396/374 |
| 7,176,962 B2 * | 2/2007 | Ejima ..................... 348/208.4 |
| 2004/0080627 A1 | 4/2004 | Kroll et al. |
| 2004/0090532 A1 | 5/2004 | Imada |
| 2004/0179110 A1 | 9/2004 | Hashimoto |
| 2004/0239771 A1 | 12/2004 | Habe |
| 2004/0239795 A1 | 12/2004 | Kitajima |
| 2007/0183765 A1 * | 8/2007 | Imamura ..................... 396/55 |

FOREIGN PATENT DOCUMENTS

| | | |
|---|---|---|
| CN | 1509071 A | 6/2004 |
| JP | 11-4380 A | 1/1999 |
| JP | 2001-157110 A | 6/2001 |
| JP | 2001-194701 A | 7/2001 |
| JP | 2004-361486 A | 12/2004 |

OTHER PUBLICATIONS

Office Action, dated Jan. 23, 2009, issued by the Korean Patent Office in corresponding KR application No. 2007-21090, 8 pages with partial English translation.
First Office Action dated Aug. 22, 2008, issued by the Chinese Patent Office in corresponding CN application No. 200710079706.1, and letter from Chinese patent attorneys forwarding same with an explanation in English dated Sep. 24, 2008 (13 pages English and Chinese).
Second Office Action dated May 12, 2010, issued by the Chinese Patent Office in corresponding CN application No. 2007-10079706.1.
Office Action dated May 6, 2010, issued by the Japanese Office Action in corresponding JP application No. 2006-065289.

* cited by examiner

Primary Examiner—Christopher Mahoney
(74) Attorney, Agent, or Firm—Sughrue Mion, PLLC

(57) ABSTRACT

A digital imaging apparatus is provided which is capable of producing a desired still image with an overly specification-bound state avoided during image shooting. In case the lightness of a subject view is within a predetermined medium range, a controller determines whether or not the camera shake compensation is to be enabled, depending on the lightness of the subject view, the subject movement detected on a through-image viewed and the continuous automatic focusing (AF) activated or not, and further determines whether the low-sensitivity shooting or high-sensitivity shooting is to be resorted to.

8 Claims, 4 Drawing Sheets

Fig. 4

| CAMERA SHAKE COMPENSATION | ISO SENSITIVITY | SHUTTER SPEED |
|---|---|---|
| OFF | ISO400 | 1/30 |
| OFF | ISO800 | 1/60 |
| OFF | ISO1600 | 1/120 |

Fig. 5

| CAMERA SHAKE COMPENSATION | ISO SENSITIVITY | SHUTTER SPEED |
|---|---|---|
| ON | ISO400 | 1/7.5 |
| ON | ISO800 | 1/15 |
| ON | ISO1600 | 1/30 |

Fig. 6

| CAMERA SHAKE COMPENSATION | ISO SENSITIVITY | SHUTTER SPEED |
|---|---|---|
| ON | ISO400 | 1/15 |
| OFF | ISO800 | 1/30 |
| OFF | ISO1600 | 1/60 |

DIGITAL IMAGING APPARATUS WITH CAMERA SHAKE COMPENSATION AND ADAPTIVE SENSITIVITY SWITCHING FUNCTION

BACKGROUND OF THE INVENTION

1. Field of the Invention

The present invention relates to a digital imaging apparatus for shooting the view of a subject. More particularly, the present invention relates to a digital imaging apparatus having a camera shake compensating and an adaptive sensitivity switching function.

2. Description of the Background Art

Recently, in order to reduce the adverse effect of camera shake as well as blur caused by subject instability during shooting of a still image, there is known a digital camera for optically reducing the effects of camera shake or for shooting with higher optical sensitivity. As a technique for determining whether blur of an image shot is ascribable to camera shake or subject instability, there is one disclosed by U.S. Patent Application Publication No. 2004/0239795A1 to Kitajima. The bracketing shooting in which sensitivity is changed from one frame to another during shooting is disclosed by Japanese Patent Laid-Open Publication No. 4380/1999 entitled "Electronic Still Camera".

In a digital camera provided with both the optical camera shake compensation function and the high-sensitivity shooting function, the image blur maybe decreased by shooting at a faster shutter speed with higher sensitivity as well as by exploiting the optical compensation for camera shake. Hence, with an extremely dark scene to be shot, the above two functions operate synergistically so as to yield a highly favorable result. However, when shooting an extremely light scene, it is unnecessary to use both of the two functions. That is, use of these two functions simultaneously represents an overly specification-bound measure.

The digital camera provided with both the optical camera shake compensation function and the high-sensitivity shooting function is thus highly effective for an extremely dark scene because the two functions may be exploited simultaneously. However, the use of these two functions for shooting a moderately light scene may represent an overly specification-bound measure, such that power consumption is increased by wasteful optical compensation for camera shake. On the other hand, in case high-sensitivity shooting is used to an extent more than necessary, the shooting noise may be increased excessively.

Moreover, subject blur in a shot image differs in nature from the blur in the shot image caused by camera shake since the degree of the subject blur is dependent upon the user's liking in variety as may be evidence by the case where the user traces and shoots a moving subject with intended blur. As the case may be, subject blur may be desirable if the shot image is taken as a work of art.

SUMMARY OF THE INVENTION

It is an object of the present invention to provide a digital camera for shooting a still image with high optical sensitivity and optical camera shake compensation with overly specification-bound processing avoided.

In accordance with the present invention, there is provided a digital imaging apparatus having a camera shake compensation function and a sensitivity switching function of switching the sensitivity at the time of shooting, wherein the digital imaging apparatus comprises an imaging unit including an image sensor for shooting the view of a subject as a still image to produce an image signal representing the view of a subject to be shot, a signal processor for processing the image signal produced by the imaging unit, and a controller for controlling the imaging unit to shoot the view of the subject. The image sensor includes a compensator for compensating for the effect of camera shake on an image of the view of the subject. The controller switches the compensation state of the compensator while also switching the optical sensitivity of the image sensor.

With the digital imaging apparatus, having the camera shake compensation function and the sensitivity switching function of switching the sensitivity at the time of shooting, according to the present invention, it is possible to switch adaptively between the enabling and disabling of the camera shake compensation and between the high-sensitivity shooting the and low-sensitivity shooting at the time of shooting a still image. As a result, the camera shake compensation function may suitably be selected, depending on prevailing situations, and the appropriate shooting sensitivity may suitably be selected, again depending on prevailing situations.

In case the ISO sensitivity bracketing function is to be exploited, it is possible to shoot a series of images with a shutter speed that may be set in plural stages depending on changes in sensitivity, and select one of the images shot which has a degree of blur desired.

BRIEF DESCRIPTION OF THE DRAWINGS

The objects and features of the present invention will become more apparent from consideration of the following detailed description taken in conjunction with the accompanying drawings in which:

FIGS. 4, 5 and 6 are diagrammatic views showing examples of the combined states of the camera shake compensation, ISO sensitivity and shutter speed in the ISO sensitivity setting mode of the illustrative embodiment.

DESCRIPTION OF THE PREFERRED EMBODIMENT

Figure 1:
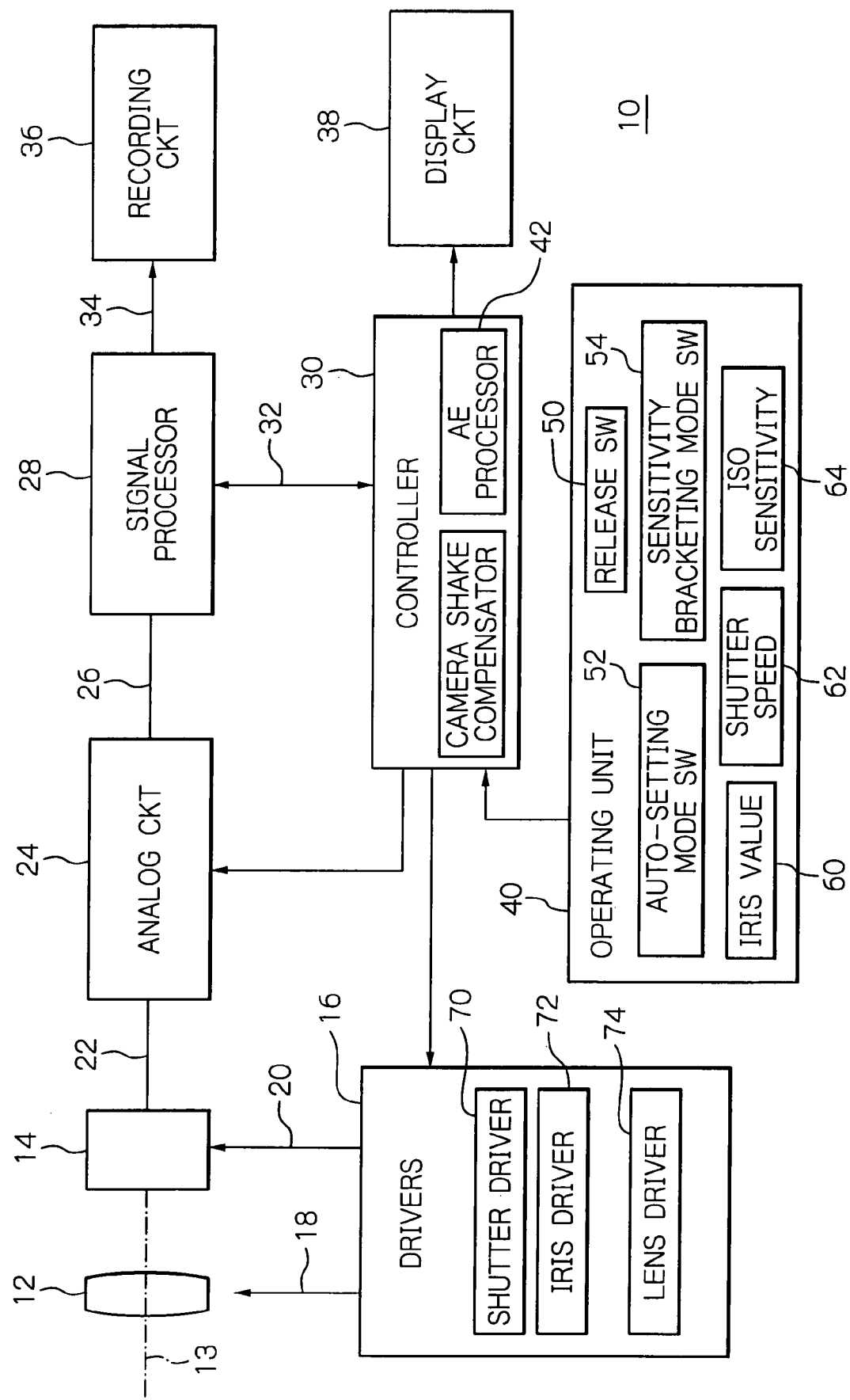
FIG. 1 is a schematic block diagram showing an illustrative embodiment of a digital imaging apparatus according to the present invention.

With reference to the accompanying drawings, a preferred embodiment of a digital imaging apparatus according to the present invention will be described in detail. Reference is first made to FIG. 1, a schematic block diagram of a digital camera 10 according to such a preferred embodiment.

Generally, the digital camera 10 shown operates for photoelectrically transducing an optical image of the view of a subject formed by an imaging lens system 12 by a solid-state image pickup device 14 to an electric pixel signal, which is output from the image pickup device 14 and in turn processed and stored in a data storage medium, such as semiconductor memory.

The lens system 12 of the present embodiment is preferably of a zoom lens having its focal length variable. The focal point position, i.e. in-focus position, of the lens system 12 is controlled in response to a lens driving signal 18 supplied from drivers 16. In the present application, signals are designated with reference numerals of connections on which they are conveyed. The lens system 12 is provided with an iris, not shown. In addition, the lens system 12 has the blur reducing function of adjusting the lens position with respect to the optical axis 13 responsive to the lens driving signal 18.

The solid-state image pickup device 14, arranged on an image plane formed by the lens system 12, is preferably implemented by a solid-state image sensor, such as color CCD (charge-coupled device). The solid-state image pickup device 14 is driven by vertical and horizontal transfer clocks, and a driving signal 20 in the form of a variety of control voltages supplied from the drivers 16 to read out signal charges generated by photodiodes arranged on its imaging surface, or photosensitive cell array, in the form of pixel signal to develop the so read out pixel signal on its output 22. Between the lens system 12 and the solid-state image pickup device 14, provided is a mechanical shutter, not shown, of which the shutter speed is controlled in cooperation with electronic shutter control for the solid-state image pickup device 14.

An analog circuit 24, connected to the output 22 of the solid-state image pickup device 14, is an analog signal processor for processing the input pixel signal 22 with correlated double sampling (CDS) and automatic-gain control (AGC). The analog circuit 24 of the present embodiment has an ISO (International Organization for Standardization) sensitivity adjustment function of adjusting the ISO sensitivity by increasing or decreasing the gain in the automatic gain control (AGC) under the control of a controller 30. The analog circuit 24 has its output 26 connected to a signal processor 28.

The signal processor 28 is a digital processing circuit for carrying out digital signal processing, such as gamma correction, white balance adjustment or pixel interpolation, on the output 26 of the analog circuit 24, in order to generate image data 32 and 34. The signal processor 28 includes on its input side an analog-to-digital converter, not shown, connected. The signal processor 28 may also be provided with the function of adjusting the ISO sensitivity through high-precision digital operation.

The signal processor 28 of the instant embodiment has the function of converting a color pixel signal, including color components, to luminance and chroma signals, made up of a luminance component and chroma components, respectively. When the present digital camera 10 carries out automatic focusing (AF), the signal processor 28, connected by a connection line 32 to the controller 30, produces the luminance signal from the processed pixel signal under the control of the controller 30 to transfer the luminance signal for AF control to the controller 30.

The signal processor 28 routes image data, generated on digital signal processing, to a recording circuit 36, connected to one output 34 of the signal processor 28. The recording circuit 36 records the image data, processed by the signal processor 28, on an information recording circuit, not shown. The recording circuit 36 includes a processing circuit having the function of compressing, by encoding, the information volume of image data, obtained on shooting.

The controller 30 is responsive to a variety of command signals, sent from an operating unit 40, to control the various components of the digital camera 10. The camera 10 has a high-sensitivity shooting mode and a camera shake compensation mode, which are manually selectable by the operating unit 40. The controller 30 also has an automatic setting mode for automatically selecting the high-sensitivity shooting mode or the camera shake compensation mode responsive to manipulation made by the user on the operating unit 40. The controller 30 also has the ISO sensitivity bracketing control function of shooting a series of image frames with a certain exposure with the ISO sensitivity adaptively shifted from one to another shooting event. The controller 30 includes an automatic exposure (AE) processor 42 for shooting under the AE control. This AE function renders an appropriate exposure amount attainable, when changing, e.g. the shutter speed or the ISO sensitivity, by re-adjusting the iris or stop value used as a parameter other than changed.

The operating unit 40 includes a shutter release switch (SW) 50, an auto-setting mode switch 52 and a sensitivity bracketing mode switch 54 disposed on its panel. The operating unit 40 also includes switches 60, 62 and 64 for setting the iris, the shutter speed and the ISO sensitivity, respectively.

The release switch 50 is used for giving the controller 30 a command signal for instructing the start of shooting. The auto-setting mode switch 52 is a manipulator switch for commanding the controller 30 to be in its auto-setting mode for carrying out shooting. In the auto-setting mode, the high-sensitivity shooting and the camera shake compensation are controlled automatically as to being enabled (on) and disabled (off). The sensitivity bracketing mode switch 54 is a manipulator switch for commanding the controller 30 to be in its ISO sensitivity bracketing shooting for carrying out multi-frame shooting, in which the ISO sensitivity is changed for each shooting with an exposure value preset.

The drivers 16 generate a driving signal for driving the lens system 12 and the solid-state image pickup device 14. The drivers 16 include a shutter driver 70, an iris driver 72 and a lens driver 74. The shutter driver 70 generates driving signals for driving the electronic shutter for the solid-state image pickup device 14 and for driving the mechanical shutter, not shown. The iris driver 72 generates a driving signal for controlling the aperture area of the iris, not shown, provided in the lens system 12.

The lens driver 74 generates a driving signal for adjusting the focal position and length of the lens system 12. In response to the driving signal 18, the lens system 12 has its lens position controlled by its mechanism, not shown, adapted for adjusting the focal position and length. In the present embodiment, the lens driver 74 also generates a driving signal for adjusting the optical axis 13 of the lens system 12 so as to compensate for the effect of camera shake under the control of the controller 30, thus driving the lens system 12 accordingly. It is noted that this optical camera shake compensation is implemented by adjusting the lens position as stated above, but is also done by adjusting the position of, for example, the solid-state image pickup device 14.

The function of the controller 30 will now be described in terms of the operating unit 40 instructing the auto-setting mode of automatically selecting the high-sensitivity shooting mode or the camera shake correcting mode. In case the lightness Bv of the subject is not higher than a predetermined minimum value, or threshold, min, the controller 30 determines that the scene to be shot is extremely dark. The controller then enables the camera shake compensation and further decides on switching to the high-sensitivity shooting, so that under these conditions, the controller 30 carries out shooting control. On the other hand, in case the lightness Bv of the subject is higher than a predetermined maximum value, or threshold, max, the controller 30 determines that the scene to be shot is extremely light. The controller then disables the camera shake compensation and further decides on switching to low-sensitivity shooting, so that, under these conditions, the controller carries out shooting control.

The controller 30 also has the function of detecting the movement, or instability, of a subject on a through-image, which is to be shot and viewed on the display screen, not shown, of the display circuit 38, and of calculating an evaluation value k1 representing the degree of movement of the subject. Moreover, the controller 30 has the function of adding a value k2 to the above evaluation value k1. This evaluation value k2 has its magnitude positive in case the continuous automatic focusing (continuous AF) function, for carrying out continuous focal point adjustment, a sort of the automatic focusing adjustment functions, is turned on and executed, for applying the weighting to the evaluation value k1.

Additionally, the controller 30 has the function of calculating an evaluation value h1, proportionate to the zooming multiplication of the lens system 12, and an evaluation value h2, proportionate to the distance up to the in-focus position. The controller 30 further has the function of dividing the sum of the evaluation values k1 and k2 by the product of the evaluation values k1 and k2 and setting the result of division as a value K. More specifically, the controller 30 calculates the value K=(k1+k2)/(h1×h2). In this case, the denominator (h1×h2) is an evaluation value which is to depend on the camera shake compensation and the numerator (k1+k2) is an evaluation value which is to depend on the high-sensitivity shooting.

The controller 30 has the function of comparing the value K found by the above calculation to a threshold value to check the value K against the threshold value. If the value K is smaller than the threshold value, the controller 30 decides on enabling the camera shake compensation and switching to the low-sensitivity shooting and carries out shooting control under these conditions. If conversely the value K is not smaller than the threshold value, then the controller 30 decides on disabling the camera shake compensation and switching to the high-sensitivity shooting and carries out shooting control under these conditions.

The function of the controller 30 will now be described in terms of the operation unit 40 instructing the ISO sensitivity bracketing control function of carrying out shooting of a series of image frames with the ISO sensitivity changed each shooting event. If an exposure value x, decided on in advance of shooting, is not larger than the predetermined minimum value min, then the controller 30 decides on enabling the camera shake compensation and switching to the high-sensitivity shooting, and sets the iris or stop value, the shutter speed and the ISO sensitivity under these conditions to carry out shooting control. If conversely the exposure value x, decided on in advance of shooting, exceeds the predetermined maximum value max, then the controller 30 decides on disabling the camera shake compensation and switching to the low-sensitivity shooting and sets on the iris value, the shutter speed and the ISO sensitivity under these conditions to carry out shooting control.

The controller 30, on which the ISO sensitivity bracketing control function has been set, has the control function in which, when the exposure value x, determined in advance of the shooting, is larger than the predetermined minimum value min and does not exceed the maximum value max, that is, in case the exposure value x exceeds the minimum value min and is not larger than the maximum value max, the controller 30 sets a plural number of combinations of the values of the iris, the shutter speed and the ISO sensitivity, and continuously carries out high-speed shooting of a series of image frames under these plural shooting conditions thus set.

Figure 2:
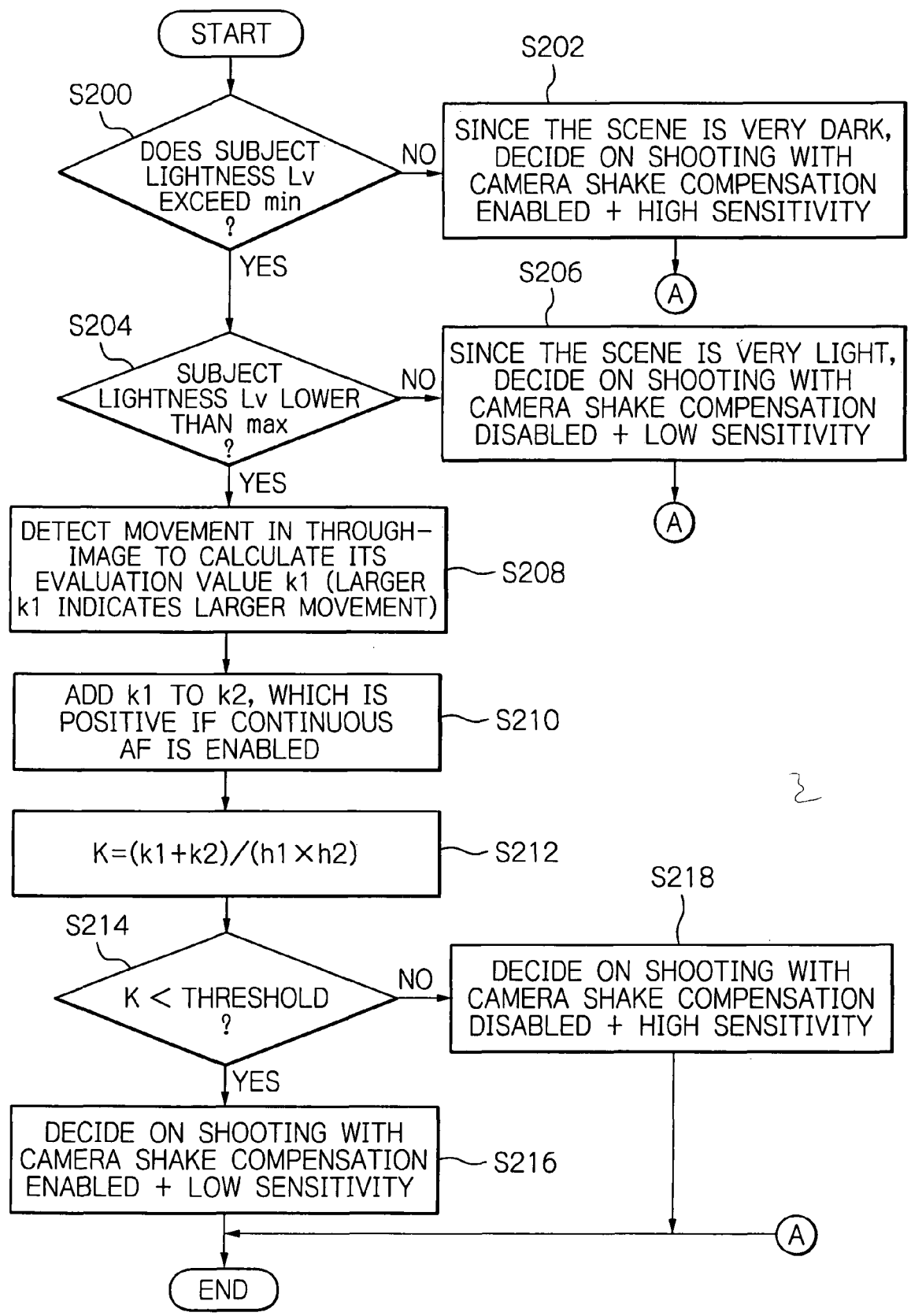
FIG. 2 is a flowchart useful for understanding the operation of the embodiment of the digital imaging apparatus in the auto-setting mode.
Figure 3:
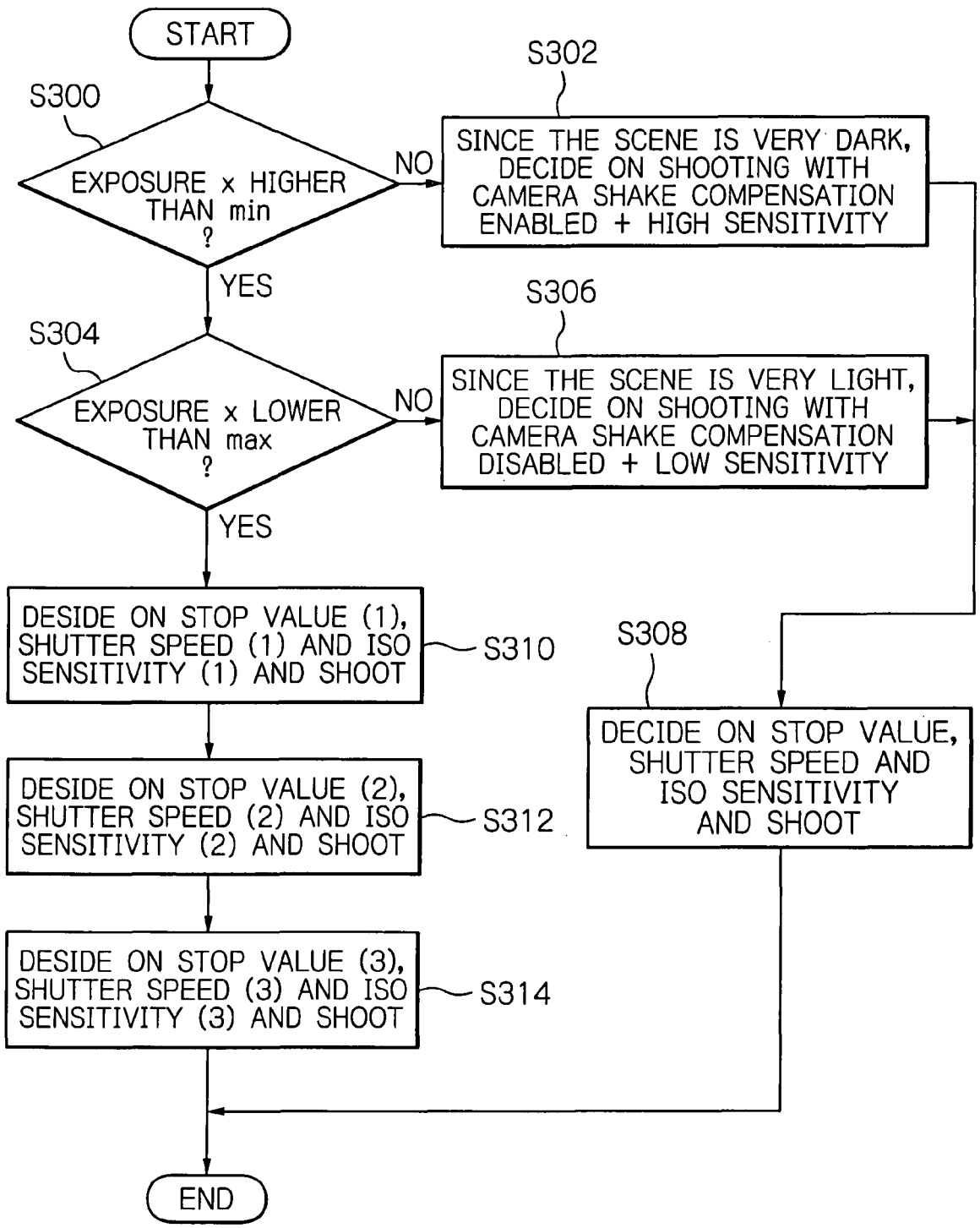
FIG. 3 is a flowchart useful for understanding the operation of the embodiment in the ISO sensitivity bracketing mode.

In the above-described configuration of the digital image pickup device 10, the operation thereof will now be described with reference to FIGS. 2 and 3. Referring first to FIG. 2, the auto-setting mode switch 52, provided on the operating unit 40, is thrust to set the auto-setting mode for the controller 30. In a step S200, the controller 30 checks to see whether or not the lightness Bv of the subject exceeds the predetermined minimum value min. If the lightness Bv does not exceed the minimum value min, then the controller 30 transfers to a step S202. In the step S202, it is determined that the scene to be shot is extremely dark. The controller 30 accordingly enables on the camera shake compensation and switches to the high-sensitivity shooting to carry out shooting control under these conditions.

In the step S200, if the lightness Bv of the subject is higher than the minimum value min, the controller 30 moves to a step S204 to check to see whether or not the lightness Bv is lower the predetermined maximum value max. If the lightness Bv is not lower than the maximum value max, then the controller 30 moves to a step S206. In the step S206, it is determined that the scene to be shot is extremely light. The controller 30 accordingly disables the camera shake compensation and switches to the low-sensitivity shooting to carry out shooting control under these conditions.

In the step S204, if the lightness Bv of the subject is lower than the maximum value max, then the controller 30 moves to a step S208. In the step S208, the controller 30 detects the movement or instability of the subject to be shot from a through-image for monitoring to calculate an evaluation value k1 representing the degree of the movement. The larger the evaluation value k1, the greater is the movement of the subject.

The controller 30 then moves to a step S210. In case the continuous auto-focusing (continuous AF) has been enabled and is executed, the controller 30 adds the value k2 to the evaluation value k1 to thereby weighting to the evaluation value k1.

The controller 30 then moves to a step S212. In the step, the controller 30 calculates an evaluation value h1, proportionate to the zooming multiplication of the lens system 12, and an evaluation value h2, proportionate to the distance up to the in-focus position. The controller 30 then divides the sum of the evaluation values k1 and k2 by the product of the evaluation values h1 and h2. That is, the controller 30 finds out a value K=(k1+k2)/h1×h2, where K is set as being the result of the division.

Next, when the controller 30 moves to a step S214, the controller 30 compares the value K, found out as described above, to the threshold value, to check to see whether or not the value K is larger than the threshold value. If the value K is smaller than the threshold value, the controller 30 moves to a step S216 to decide on enabling the camera shake compensation on and further switching to the low-sensitivity shooting. The controller 30 performs the shooting control under these conditions. If conversely the value K is not smaller than the threshold value, the controller 30 moves to a step S218 to decide on disabling the camera shake compensation and further switching to the high-sensitivity shooting, the controller 30 performing the shooting control under these conditions.

Thus in the present embodiment, for a scene to be shot which is light to a certain extent, the degree of importance, or weight, can adaptively be put on either the camera shake compensation or the high-sensitivity shooting in making a decision as to which of the camera shake compensation or the high-sensitivity shooting is to be resorted to, i.e. to be executed. The following may be enumerated as clues in determining which of the two means, high-sensitivity shooting or camera shake compensation, is to be resorted to in which cases. None of the two means needs to be resorted to if a scene to be shot is significantly light. The camera shake compensation is to be resorted to if a scene to be shot is light to the certain extent with the zooming multiplication higher or the in-focus position remoter, or without viewing a quickly-moving object in a through-image.

The high-sensitivity shooting is to be resorted to if a scene to be shot is light to a certain extent, or moderately light, with the zooming multiplication smaller, the in-focus position proximate, or a through-image including a fast-moving object viewed, or if the continuous AF mode is set and it is determined that the shooter traces a moving subject. Both means, the high-sensitivity shooting plus the camera shake compensation, are to be resorted to if a scene to be shot is extremely dark.

Thus, parameters or factors which should be taken into account in adaptively changing the relative importance to be put on either of the camera shake compensation and the high-sensitivity shooting in dependent upon a scene to be shot may include a motion detected in a through-image, zooming multiplication, in-focus position and the continuous AF mode. The illustrative embodiment is adapted to comprehensively consider those parameters or factors to give weight appropriate one or ones of them for adaptively controlling the enabling or disabling of the camera shake correcting function and the high-sensitivity shooting.

It is noted that image blur caused by subject instability is, in distinction from camera shake, thought to be variably desirable, e.g. from one user to another. For example, subject blur would be desirable in case of shooting a moving subject. If such a scene would nevertheless be fixedly determined as a scene where the high-sensitivity shooting is to be resorted to so as to be shot with the subject blur reduced, then the result would not be desirable. Conversely, if a scene which the user intends to shoot with the effects of camera shake as small as possible, that is, with both the camera shake compensation and the high-sensitivity shooting, would be erroneously determined to be captured solely with the camera shake compensation resorted to, then the result would also be undesirable. Hence, the system may be adapted so as to shoot the subject not on the basis of the decision given in the step S218 or S216 but with the ISO sensitivity bracketing to permit the shooter to select one of the photos captured which is of the optimal subject blur.

Description will now be made in detail on the operation of the digital image pickup device 10 in case the ISO sensitivity bracketing control is commanded by the sensitivity bracketing mode switch 54 manipulated on the operating unit 40. Referring to FIG. 3, the controller 30 in a step S300 determines whether or not the exposure value x determined in advance of the shooting event is higher than the predetermined minimum value min. If the exposure value x is not higher than the minimum value min, then the controller 30 transfers its control to a step S302 to decide both the camera shake compensation and the switching to the high-sensitivity shooting to be enabled, and determines the iris value, the shutter speed and the ISO sensitivity appropriately under these conditions thus determined. Conversely, if the exposure value x is higher than the minimum value min, the controller 30 moves from the step S300 to a step S304.

In the step S304, the controller 30 determines whether or not the exposure value x determined in advance of the shooting event is lower than the predetermined maximum value max. If the exposure value x is not lower than the maximum value max, the controller 30 moves to a step S306 to decide the camera shake compensation to be disabled and the switching to the low-sensitivity shooting, and determines the iris value, the shutter speed and the ISO sensitivity appropriately under these conditions. In a step S308, following the steps S302 and S306, the processing for an actual image shooting is carried out responsive to the release switch 50 depressed, using the iris value, the shutter speed and the ISO sensitivity determined as described above.

In the step S304, if the exposure value x is lower than the maximum value max, that is, in case the exposure value x is higher than the minimum value min but not the maximum value max, then the controller 30 sets, in steps S310, S312 and S314, a plural number of combinations of the iris value, the shutter speed and the ISO sensitivity, and executes high-speed shooting of a series of image frames in succession under the plural number of shooting conditions thus set.

FIGS. 4, 5 and 6 show shooting conditions to be used at the time of bracketing shooting. Specifically, FIG. 4 shows several combinations or sets of the camera shake compensation, the ISO sensitivity and the shutter speed for a relatively lighter scene to be shot. In this case, the camera shake compensation is disabled for all of the three combinations. The ISO sensitivity is set to, e.g. 400, 800 and 1600, for which the shutter speed is adjusted to $\frac{1}{30}$ sec, $\frac{1}{60}$ sec and $\frac{1}{120}$ sec, respectively.

In a relatively darker scene to be shot, the probability of occurrence of camera shake is higher, as shown in FIG. 5, and hence the camera shake compensation is enabled for all of the three cases. The ISO sensitivity is set to, e.g. 400, 800 and 1600, for which the shutter speed is adjusted to $\frac{1}{7.5}$ sec, $\frac{1}{15}$ sec and $\frac{1}{30}$ sec, respectively.

In a scene to be shot with lightness between the above two cases, the ISO sensitivity is set to, e.g. 400, 800 and 1600, as shown in FIG. 6, for which the shutter speed is adjusted to $\frac{1}{15}$ sec, $\frac{1}{30}$ sec and $\frac{1}{60}$ sec, respectively. The camera shake compensation is enabled for shooting for the longer shutter speed of $\frac{1}{15}$ sec and is disabled for shooting with the shutter speed higher than this low shutter speed.

The entire disclosure of Japanese Patent Application No. 2006-65289 filed on Mar. 10, 2006, including the specification, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A digital imaging apparatus having a camera shake compensation function and a sensitivity switching function of switching sensitivity at a time of shooting, comprising:

an imaging unit including an image sensor for shooting a view of a subject as a still image to produce an image signal representative of the view;

a signal processor for processing the image signal produced by said imaging unit; and a controller for controlling said imaging unit to shoot the view of the subject, said imaging unit including a compensator for compensating for an effect of camera shake on an image of the view of the subject, said controller switching a compensation state of said compensator and switching optical sensitivity of said image sensor, said controller including a movement detector for detecting movement of the subject on the image signal produced from said imaging unit and viewed as a through-image, said controller being responsive to the movement detected to control the sensitivity setting at the time of shooting.

2. The apparatus in accordance with claim 1, wherein said controller switches enabling and disabling of the compensation state of said compensator.

3. The apparatus in accordance with claim 2, wherein said controller controls the enabling and disabling of the compensation of said compensator and sensitivity setting at the time of shooting depending on a zooming multiplication of an imaging lens of said imaging unit.

4. The apparatus in accordance with claim 2, wherein said controller controls the enabling and disabling of the compensation of said compensator and sensitivity setting at the time of shooting depending on an in-focus position of an imaging lens of said imaging unit.

5. The apparatus in accordance with claim 2, wherein said controller renders a continuous automatic focal point adjustment for effecting continuous automatic focal point adjustment for the view of the subject, and controls the enabling and disabling of the compensation of said compensator and sensitivity setting at the time of shooting depending on the enabling or disabling state of the continuous automatic focal point adjustment.

6. The apparatus in accordance with claim 5, wherein said controller is responsive to an in-focus position of a lens of said imaging unit to calculate a first evaluation value depending upon the camera shake compensation and a second evaluation value which depending upon high-sensitivity shooting, said controller being responsive to the first and second evaluation values to determining which of the compensation by said compensator or the high-sensitivity shooting is to be resorted to for effecting shooting control depending on a result of the determination.

7. The apparatus in accordance with claim 1, wherein said controller is responsive to lightness of the view of the subject to switch the compensation state of said compensator and the optical sensitivity at the time of shooting the still image.

8. A digital imaging apparatus having a camera shake compensation function and a sensitivity switching function of switching sensitivity at a time of shooting, comprising:

an imaging unit including an image sensor for shooting a view of a subject as a still image to produce an image signal representative of the view;

a signal processor for processing the image signal produced by said imaging unit; and a controller for controlling said imaging unit to shoot the view of the subject, said imaging unit including a compensator for compensating for an effect of camera shake on an image of the view of the subject, said controller switching a compensation state of said compensator and switching optical sensitivity of said image sensor, said controller being responsive to an exposure value determined depending on lightness of the view of the subject to set a plurality of combinations of an iris value, a shutter speed and shooting sensitivity to execute shooting a series of image frames under a condition of the plurality of combinations set.

* * * * *